United States Patent [19]
Holder

[11] Patent Number: 4,731,915
[45] Date of Patent: Mar. 22, 1988

[54] MACHINERY SUPPORT AND METHOD

[76] Inventor: Royce Z. Holder, 910 W. 62nd St., Odessa, Tex. 79764

[21] Appl. No.: 19,302

[22] Filed: Feb. 26, 1987

[51] Int. Cl.$^4$ .................. B23P 7/00; F16M 1/00; F16M 13/00; E04B 1/16
[52] U.S. Cl. .................. 29/402.03; 29/402.18; 29/426.1; 29/527.1; 29/DIG. 5; 29/DIG. 25; 29/DIG. 29; 248/679; 264/31
[58] Field of Search .......... 29/402.03, 402.18, 426.1, 29/426.4, 527.1, DIG. 5, DIG. 25, DIG. 29; 248/679; 264/31, 36

[56] References Cited

U.S. PATENT DOCUMENTS

| 3,190,041 | 6/1965 | Kimball | 248/679 |
| 4,331,314 | 5/1982 | Chacour et al. | 248/679 |

FOREIGN PATENT DOCUMENTS

| 140580 | 3/1980 | German Democratic Rep. | 248/679 |
| 682722 | 9/1979 | U.S.S.R. | 248/679 |

*Primary Examiner*—Howard N. Goldberg
*Assistant Examiner*—Ronald S. Wallace
*Attorney, Agent, or Firm*—Milburn, Hudman & Peterson

[57] ABSTRACT

A structural mounting for a heavy machinery with rotating parts being supported between a foundation surface and the heavy machinery is disclosed which includes an impermeable foundation surface supporting spaced apart columns of epoxy or similar grouting material with epoxy or similar grouting material chocks extending from the plurality of columns to the support frame of the heavy machinery or engine which provide a non-adherent support between the columns and the engine mounting frame. The columns surround but do not adhere to anchor bolts secured in the foundation. The epoxy chocks likewise do not adhere to the anchor bolts. The anchor bolts are protected with a shroud or wrapping of suitable material whereby post tensioning of the anchor bolts will not cause the columns or chocks to crack or fracture. Leveling screws threadedly engaged through the mounting flange of the machine may or may not extend through the chocks and seat upon leveling plates. The columns and chocks are formed in situ. The structural supports disclosed may be used for new installations or replacement of previous installations after the existing installation has been removed in a suitable manner. After the heavy machinery has been aligned and leveled, the leveling screws and any jack screws are released and the anchor bolts are tensioned to a suitable torque.

20 Claims, 4 Drawing Figures

MACHINERY SUPPORT AND METHOD

BACKGROUND OF INVENTION

In manufacturing of large rotating equipment, such as, for example turbine generators, much effort is extended in obtaining the exact size of shafts, bearings, and other components of the machinery and accurately aligning such components. Regardless of the accuracy and the efforts in manufacturing such heavy machinery to close tolerances, when the machine is assembled in position and placed upon the foundation or support, the machinery must be accurately leveled and aligned so that no portion of the apparatus buckles or is under undue stress because of lack of the proper leveling and support. Such lack of leveling may occur at the time of installation or at a later time if the support shifts in the position even slightly because of crushing or deterioration of the support.

In the past, it has been customary in installing a large piece of rotating machinery to arrange a plurality of accurately level sub-sole plates to support a main sole or foundation plate which is secured to a concrete or base foundation by means of foundation bolts. Accurately leveling the sub-sole plate was a long, tedious and expensive process and frequently required the use of shims or other adjusting or filler devices. Furthermore, since there were a number of sub-sole plates which had to be brought to the same level position, an inaccuracy in one such sub-sole plate could produce undesired stresses in the frame and other components of the machinery. After a period of use, any shims may produce such stresses through corrosion or similar changes or through yielding under long sustained stresses.

In U.S. Pat. No. 3,190,041, a support for large machinery is described. The foundation comprises a base portion which may be formed of concrete or metal or other material and a plurality of grout or mortar pads positioned between the base portion and the foundation plate. In forming the composite supporter foundation, a foundation plate is first placed in a level spaced position relative to the upper surface of the base portion by means of a plurality of leveling screws which threadedly engage a foundation plate and whose lower end engages the upper surface of the base portion. After the foundation plate has been accurately leveled by means of leveling screws, nuts are screwed on to the foundation bolts to secure the foundation plate in this level position. Metal washers or spacers may be positioned between the respective nuts and the upper surface of the plate.

After the foundation plate is rigidly secured in a leveled position above the upper surface of the base, mortar forms are position between the base and foundation plate, and a grouting material is ram-packed inside the mortar forms between the foundation plate and the upper surface of the base portion, thus forming mortar pads to support the foundation plate. After the pads have been completely cured, the foundation plates are removed so that the support pads for the foundation plate are cleaned up and the form removed from the support. Then, the foundation plate is repositioned on the grout or mortar pads, and then the heavy machinery would be attached to the foundation plate.

U.S. Pat. No. 4,331,314 describes an anchoring arrangement for a head pump/turbine discharge ring. The arrangement provides a pre-stressed anchor stud connected between an upper foundation ring and the flange portion of the discharge ring which is pre-stressed and affects the leveling to the discharge ring. The upper leveling plate is attached to a lower leveling plate embedded in concrete or similar foundation material, and is pre-stressed to grouting material between the foundation structure and the upper leveling ring.

OBJECTS AND SUMMARY

It is the object of the invention to provide a columnar support for heavy machinery which is more easily constructed and repaired when necessary.

It is another object of the invention to provide a columnar support for heavy machinery having a concrete foundation covered or sealed with a base of epoxy grouting material, a series of first tier independent columns or pedestals, which may or may not adhere to the epoxy base, extending from the base, and a second tier of pedestals or chocks, which are non-adhering to the first tier of columns or pedestals, interspersed between the machine and the first tier of independent columns or pedestals.

It is the further object of the invention to replace existing foundation mountings with columnar supports and chocks wherein previous grouting material and foundations are removed and replaced with columns or pedestals and chocks in accordance with this invention.

It is another object of the invention to form a support foundation for heavy machinery comprising structural supports between a foundation surface and heavy machinery including epoxy grouting material columns mounted on the foundation, which may be non-adherent to said foundation, and epoxy chocks mounted upon the columns extending between the columns and the machinery.

It is another object of the invention to provide structural supports for heavy machinery with rotating parts between a foundation surface and heavy machinery including epoxy grouting material columns and non-adherent epoxy chocks wherein the underside of the heavy machinery may be examined, cleaned and repaired without destruction of the structural supports or foundation.

It is another object of the invention to provide structural supports for heavy machinery with rotating parts between a foundation surface and heavy machinery including epoxy grouting material columns and non-adherent epoxy chocks wherein the structural supports may be individually replaced to maintain the heavy machinery in alignment and level.

It is another object of the invention to provide structural supports for heavy machinery with rotating parts between a foundation surface and heavy machinery including epoxy grouting material columns and non-adherent epoxy chocks wherein any indications of leaks, cracks or other machinery or structural support failures may be readily discovered.

It is another object of the invention to provide structural supports for heavy machinery with rotating parts between a foundation surface and heavy machinery including epoxy grouting material columns and non-adherent epoxy chocks wherein the heavy machinery may be more adequately ventilated.

DESCRIPTION OF THE INVENTION

Figure 1:
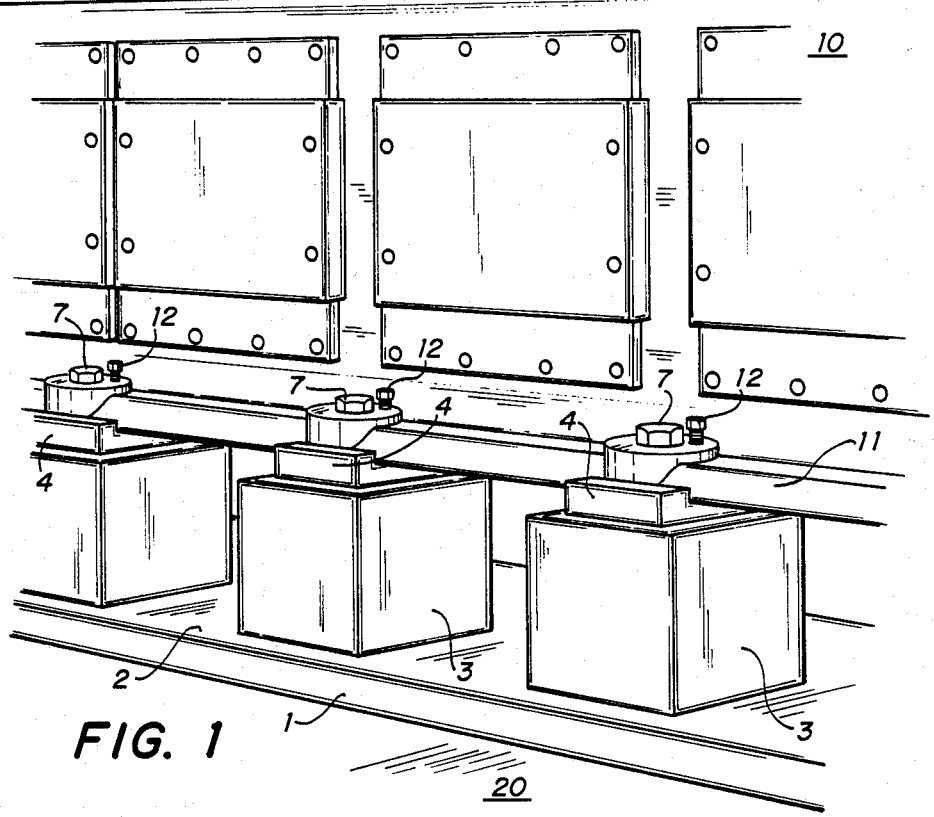
FIG. 1 is a perspective view of a portion of the machine illustrating the completed support embodying the invention.
Figure 2:
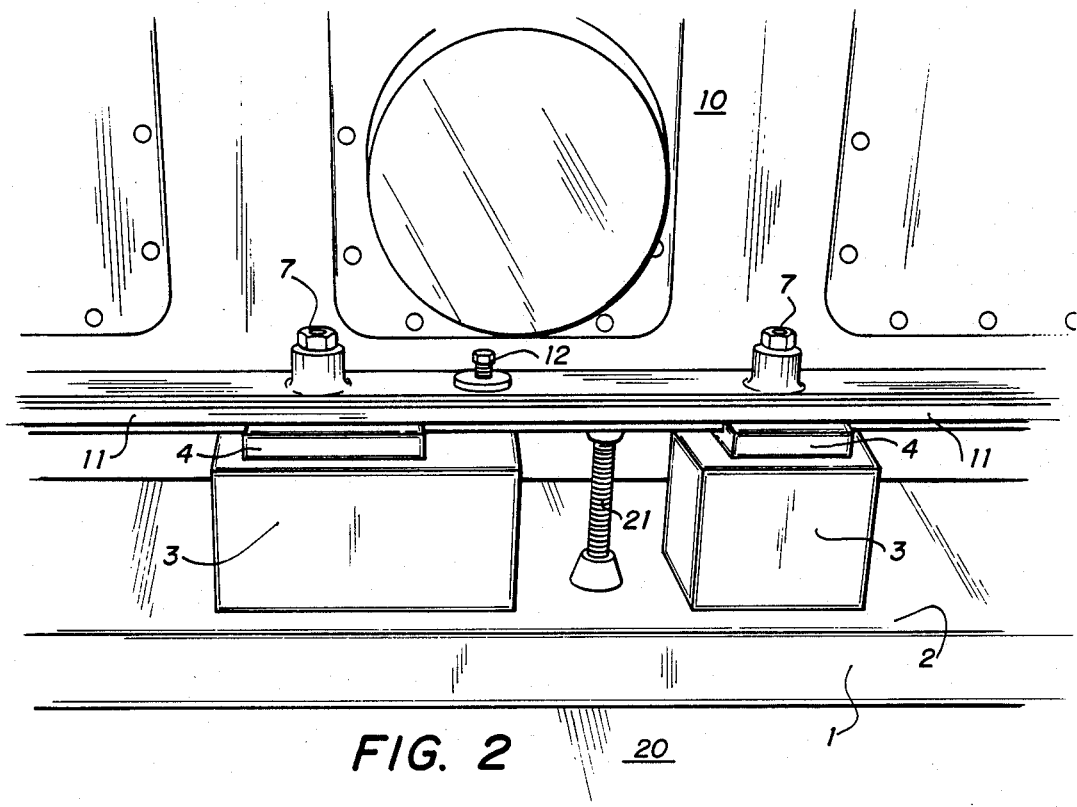
FIG. 2 is another perspective view of a portion of a machine illustrating leveling means of a support embodying the principle of this invention.
Figure 3:
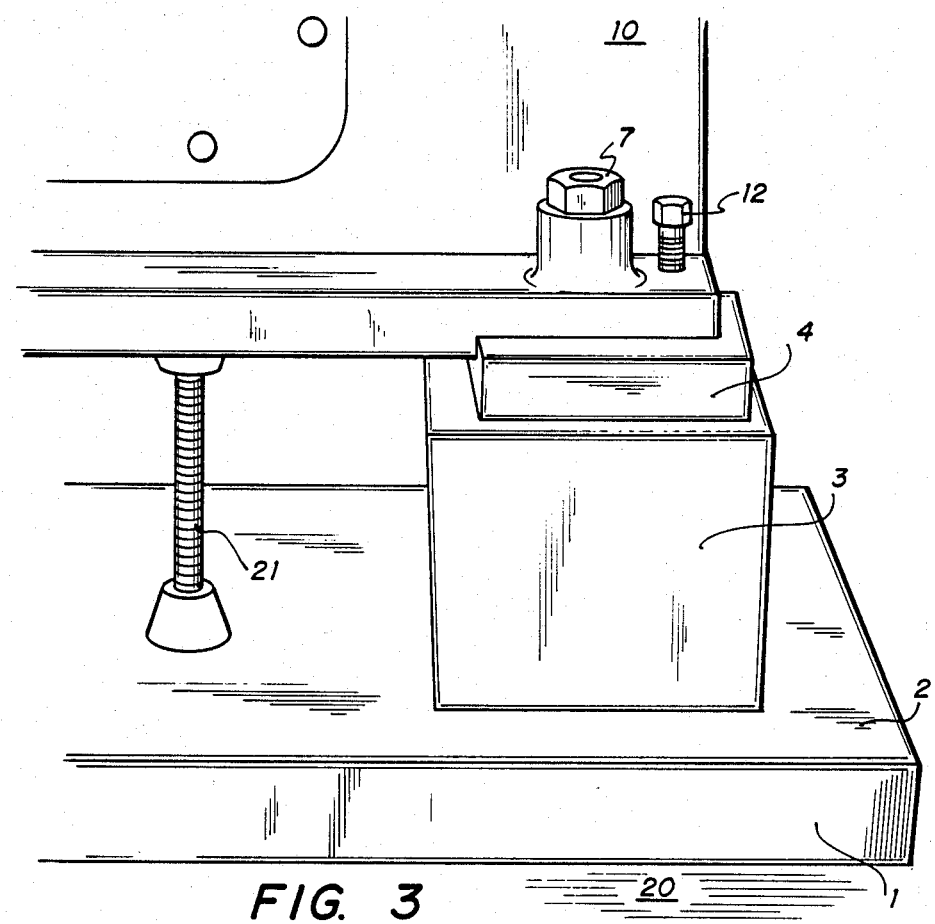
FIG. 3 is another perspective view of a portion of a machine illustrating the columnar support and leveling means.

Referring to the Drawing and in particular FIGS. 1, 2 and 3, a section of the engine or machinery generally 10 is illustrated supported on a section of foundation generally referred to as 20 having a concrete base 1 and a seal layer or cap 2 made of epoxy grouting material. This epoxy cap 2 would extend under the entire engine mounting. Seated upon the epoxy cap 2 are columns or pedestals 3 which may be formed to be adherent or non-adherent to the epoxy seal or cap 2. Chocks 4 fill the space between a machine mounting flange 11 and columns 3 which are poured in situ and are designed to be non-adherent to either the mounting flange 11 or the columns 3. Further referring also to FIG. 4, anchored in and extending from the concrete base 1 of foundation 20 are anchor bolts 7 which are of sufficient length to protrude through the columns 3 and chocks 4 above the mounting flange 11 where nuts 8 and washers 9 are positioned. Along the mounting flange 11 in proximity of the anchor bolts 7 are leveling screws 12 which threadedly engage the flange 11 and extend through the chocks 4 and rest against leveling plates 13 which are seated upon columns 3 and are surrounded by chocks 4. In some areas leveling screws 12 and leveling plates 13 are not surrounded by chocks 4. The anchor bolts 7 and leveling screws 12 are prevented from adhering to columns 3 and chocks 4 by suitable means, such as shrouds or wrappings.

It will be understood and appreciated that for mounting the engine or machine 10, multiple columns 3 and chocks 4 will be required for anchor bolts 7 and leveling screws 12. The surface area of chocks 4 and columns 3 are approximately twice the surface area needed to support the engine or machinery 10 in accordance with the various characteristics of the grouting material used for columns 3 and chocks 4.

Figure 4:
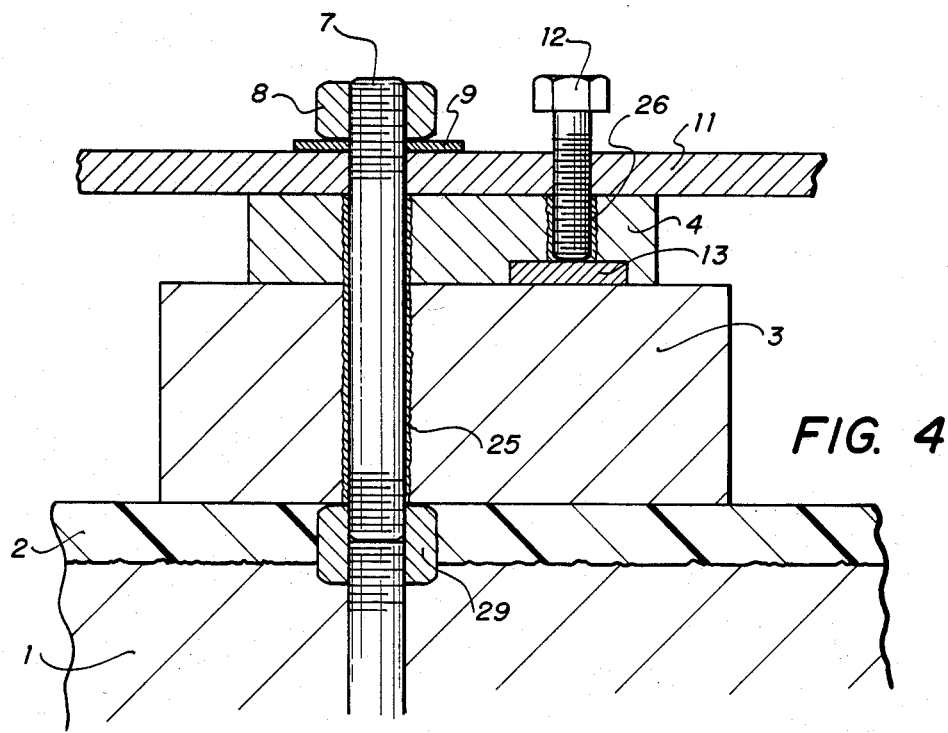
FIG. 4 is a sectional view illustrating the columnar support of the invention.

Referring to the drawings, and in particular FIGS. 3 and 4, a new machine installation will be discussed and described. Having selected a suitable location for the machine foundation, a concrete pad or base 1 is poured and allowed to cure for a suitable length of time. In pouring the concrete base, anchor bolts 7 are positioned in the appropriate location of the foundation on which the machine or engine 10 will be positioned. Also, jack screws 21 for raising and lowering the engine 10 may be provided. Of course, the jack screws 21 for raising and lowering the engine 10 as well as the anchor bolts 7 must be properly positioned for the particular engine or machine 10 being mounted such that the anchor bolts 7 would extend through eyelets provided in mounting flange 11. Also the jack screws 21 would be located so that they would extend under the flange of the machine being raised or lowered into position but would not be placed where columns 3 are to be positioned. Upon completing the concrete base, an epoxy grouting material seal or cap 2 is provided on the concrete base 1 so that a smooth impermeable surface would be provided for the base 1 and seal or cap 2 of the foundation 20. Next, columns 3 are prepared by placing suitable forms surrounding the area of the anchor bolts and providing bolt shrouds or wrappings 25 surrounding the anchor bolt 7 in such a manner as to maintain anchor bolts 7 free of the column grouting material. When the columns have been fully cured, the columns 3 are cleaned and the upper surface treated in such a manner as to prevent any adherence by the epoxy chocks 4. Perhaps wax or other material would suffice. The mounting flange 11 of the machine 10 is to be supported with the epoxy chocks surrounding the anchor bolt 7 in such a manner as to maintain the bolt free of column grouting material. The flange of the machine to be supported by the epoxy chocks 4 is likewise cleaned and treated so that the epoxy chocks 4 will not adhere to the mounting flange 11. The machine 10 is then positioned so that the flanges are within no more than two inches above the surface of the epoxy columns 3 and seated over anchor bolts 7. Leveling plates 13 are positioned on the epoxy columns 3 under leveling screws 12 which are threadedly engaged through mounting flange 11 of machine 10. The nuts 8 and washers 9 for anchor bolts 7 are positioned over the anchor bolt but no tension is applied to the anchor bolts. The machine 10 is then leveled and aligned by adjusting leveling screws 12 and jacks screws 21 using generally known leveling and aligning techniques.

Once the machine 11 has been properly aligned and leveled, suitable shrouds 26 or other suitable protective wrap are placed around leveling screws 12 between the mounting flange 11 and the leveling plate 13 to prevent the chocks 4 from adhering to the leveling screws. Suitable forms for pouring the chocks 4 around the anchor bolts 7 and the leveling screws 12 are positioned between mounting flange 11 and the columns 3. The forms are prepared in such a manner as to provide a filling area above the bottom of the mounting flange 11 in order to assure full flow of the material forming chocks 4 and complete filling between the columns 3 and the mounting flange 11. After the epoxy chocks have fully cured, the forms are then removed. Thereafter, the nuts 8 are tightened down on the anchor bolts 7 to maintain the machine 10 in the leveled and aligned position. The leveling screws 12 and jack screws 21 are released.

The materials used in preparing the foundation may be any suitable grouting material, however, excellent results have been obtained from using Dural 201 Slow Set, a slow setting epoxy mortar and grout available from Dural International Corp. in Deer Park, N.Y. for forming the columns 3 in situ. Likewise, the Dural 201 Slow Set is useful for the epoxy cap 2. For purposes of casting the chocks 4, it is preferable to use Durachock Orange, a grouting and casting resin available from Dural International Corp. in Deer Park, N.Y. Obviously, other materials are and will become known which can be used for the purpose of pouring and forming colums 3 and chocks 4. Further, duct tape of suitable width may be used for shrouds or wrappings 25 and 26.

In the repair of machine mountings, it would be necessary to chip out all the existing grouting material down into the concrete foundation while supporting the machine on jack screws or the like. Referring to FIG. 4, any foundation anchor bolts 7 that are broken could then be repaired by re-threading and using a coupling nut 29 to replace the existing anchor bolt with the new portion extending from the concrete foundation up to the height of the machine. After the foregoing removal of the existing grouting material and concrete foundation suffucient to permit repairing the foundation, then the procedure is the same as described above using the epoxy cap 2 and the procedures for casting the columns 3 and the chocks 4 as aforedescribed.

It will be appreciated that various modifications and changes to the procedure heretofore described will be suggested and any such modification and changes are intended to be covered by this application.

What I claim is:

1. In a machine support system, a method of repairing machine supports having a foundation including grouting material with anchor bolts for securing a machine to said support and leveling means to level and align the machine comprising releasing the tension and strain on the machine, removing existing machine support materials for a minimum depth necessary to expose the lowest portion of the machine and providing adequate space for new supports while supporting the machine on temporary supports, forming a layer of grouting material over the foundation, forming multiple columns extending upward from the layer over the concrete foundation under support members of the machine and surrounding, but not adhering to, the anchor bolts, leveling the machine with said leveling means, thereafter forming epoxy chocks upon the columns, surrounding, but not adhering to, the anchor bolts and extending between the columns and said support members for supporting said machine, and thereafter releasing the leveling screws and post-tensioning the anchor bolts to secure the machine upon said machine support.

2. The method of claim 1 wherein the layer of grouting material is an epoxy material and the foundation includes a concrete base.

3. The method of claim 2 wherein the grouting material for forming the chocks is an epoxy casting resin.

4. The method of claim 3 wherein the chocks are formed in situ.

5. The method of claim 4 wherein the chocks are non-adherent to the columns and machine support.

6. The method of claim 5 wherein the leveling means includes leveling screws threadedly engaged through the machine flange and leveling jacks seated under the machine flange interspaced between the columns, and the leveling screws are released and then the leveling jacks are released.

7. The method of forming a permanent, non-corrosive level support for a heavy machine which comprises forming a foundation block having anchor bolts secured in and extending upward from said foundation block, forming multiple columns of a grouting material extending upward therefrom and surrounding, but not adhering to, the anchor bolts, leveling and aligning the machine by suitable known means, and forming chocks of a grouting material seated on each of said columns and surrounding said anchor bolts, but not adhering thereto, said chocks supporting the heavy machine.

8. The method of claim 7 wherein said foundation block is concrete.

9. The method of claim 8 wherein said concrete foundation block is layered with a seal compound thereby forming a relatively inpermeable surface thereon.

10. The method of claim 9 wherein the grouting material for the columns is an epoxy material.

11. The method of claim 10 wherein the grouting material for the chocks is an epoxy casting resin.

12. The method of claim 11 wherein the chocks are formed in situ.

13. The method of claim 12 wherein the chocks are non-adherent to the columns and heavy machine support.

14. A support for a heavy machine which comprises a foundation block having anchor blots secured in and extending upward therefrom, a seal layer of a relatively impermeable surface upon said foundation block, multiple columns of a grouting material extending upward from the seal layer and surrounding, but not adhering to, the anchor bolts, chocks of a grouting material seated on each of said columns and surrounding said anchor bolts, but not adhering thereto, said chocks supporting the heavy machine from the columns.

15. The support of claim 14 wherein the foundation block is concrete.

16. The support of claim 15 wherein the seal layer is an epoxy grouting material.

17. The support of claim 16 wherein the multiple columns are an epoxy grouting material.

18. The support of claim 17 wherein the chocks are an epoxy casting resin.

19. The support of claim 18 wherein the chocks are non-adherent to the columns and heavy machine support.

20. The support of claim 19 wherein the chocks are formed in situ.

* * * * *